Dec. 13, 1949 R. E. BLAND 2,490,774
MOVING BED HYDROCARBON CONVERSION SYSTEM
Filed Nov. 29, 1947
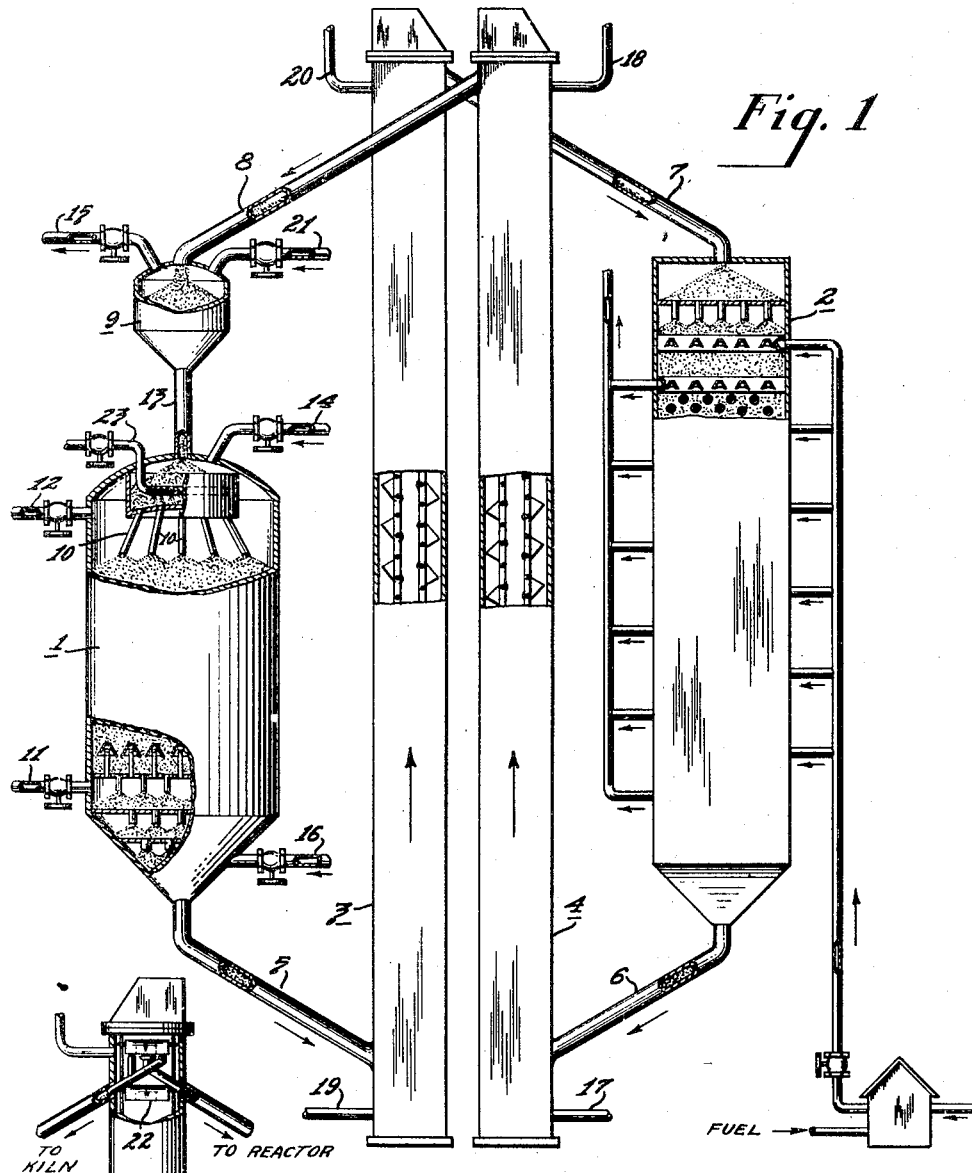
Fig. 1
Fig. 2
Fig. 3
INVENTOR
ROPHIE E. BLAND
BY
ATTORNEY Patented Dec. 13, 1949

2,490,774

UNITED STATES PATENT OFFICE 2,490,774

MOVING BED HYDROCARBON CONVERSION SYSTEM

Rophie E. Bland, New York, N. Y., assignor to Houdry Process Corporation, Wilmington, Del., a corporation of Delaware Application November 29, 1947, Serial No. 788,817

9 Claims. (Cl. 196—52)

The present invention relates to hydrocarbon conversion systems employing solid moving beds of catalyst, wherein the catalyst is passed through separate zones for conversion of hydrocarbons and for subsequent regeneration of the catalyst by burning of carbonaceous deposit formed thereon as by-products of the hydrocarbon conversion reactions. The invention is particularly concerned with operations conducted in such systems wherein an active clay catalyst is employed.

Although various designs of apparatus of the type indicated are found in the patent and technical literature, the most familiar constructions in wide commercial use are those in which one or more mechanical elevators and connecting conduits are employed for transporting used catalyst from the bottom of a reactor to a kiln for regeneration and for returning catalyst from the bottom of the kiln to the reactor.

When a calcined or otherwise dehydrated active clay catalyst is treated with steam at temperatures in the order of 700° F. and above, the heat of hydration due to adsorption of the steam by the clay gives rise to an increase in temperature in the order of about 50–100° F. According to the present invention, the hydrocarbon conversion system and operation is so devised that better advantage can be taken of this increase in temperature of the catalyst for beneficial purposes.

During regeneration in normal operation, catalyst is subjected to temperatures in the order of 800–1200° F. and sometimes above, and the catalyst is contacted with moving gases which effect substantial dehydration of the catalyst. In this dehydrated condition the catalyst can readily take on available moisture from its surroundings until it reaches its point of saturation. The elevators employed in transporting the catalyst are conventionally enclosed and operated in housings which are not sealed against admission of outside air, so that during transportation the catalyst may take on moisture from the air; the resulting heat of hydration however will not be usefully retained by the catalyst because of heat losses and dissipation in transit and handling, before the catalyst is brought into contact with hydrocarbons in the reactor. The quantity of additional steam that can be adsorbed by the catalyst beyond the elevator is limited, of course, by the adsorption capacity of the clay, so that with catalyst already containing a substantial quantity of previously adsorbed moisture, the full advantage of temperature elevation due to steam adsorption that might be usefully employed in the hydrocarbon conversion reaction is not available.

In accordance with the present invention, the moving catalyst system is so devised that dissipation of heat of hydration of the clay catalyst employed is minimized, and such heat is made available for beneficial utilization in the hydrocarbon reaction zone. This is accomplished by maintaining the regenerated clay catalyst in substantially dehydrated state after passage from the regeneration zone and during transport, then hydrating the catalyst in a selected hydrating zone such that substantially the entire heat of hydration contained in the catalyst is made available in the reaction zone. In accordance with the preferred embodiment of the invention, the catalyst is maintained in essentially dehydrated state after leaving the kiln, by providing a surrounding blanket of a substantially moisture free gas to protect the catalyst during the intermediate transfer stages.

The details of the invention will be more fully understood when read in connection with the accompanying drawing which illustrates one general form of apparatus that may be employed in a practical application of the invention. It will be understood that the invention is not limited to the use of the particular apparatus illustrated, but that the principles of the invention are generally applicable to other types of apparatus wherein catalyst is moved as a continuous bed through a reactor, the spent catalyst being conveyed to a separated zone for regeneration and thereafter returned to the reactor.

In the accompanying drawings, Fig. 1 is a diagrammatic representation in elevation of one type of moving catalyst system, parts being broken away and shown in partial cross section; Fig. 2 illustrates a modified elevator system; Fig. 3 is a perspective view of a type of elevator bucket employed in the embodiment of Fig. 2.

Referring now generally to Fig. 1, there is shown a reactor 1, a regenerator kiln 2, and means for transferring catalyst from the bottom of the reactor to the regenerator and returning regenerated catalyst from the regenerator to the top of the reactor; said means comprising a spent catalyst elevator 3, a regenerated catalyst elevator 4, and connecting conduits 5, 6, 7 and 8. The direction of movement of the catalyst is indicated by the arrows. Above the reactor 1, there is provided a catalyst supply hopper 9, for feeding regenerated catalyst and adding fresh catalyst to the reactor, the catalyst gravitating through distributing downcomers 10 and through the reactor 1 until discharged therefrom through conduit 5. Preheated hydrocarbons, generally in vaporized form, are brought into contact with the moving bed of catalyst in the reactor and the catalytic conversion products thereof discharged from the reactor, by lines 11 and 12. The system may be operated counter-currently, in which event the hydrocarbon vapors are charged through line 11 and the conversion products removed through the line 12. It is preferred, however, to operate con-currently, charging the hydrocarbons through line 12 and removing the converted products through line 11.

Between the catalyst supply hopper 9 and the reactor 1 there is provided a seal leg 13. A gas supply line 14 is provided for the introduction of seal gas above the catalyst bed level in the reactor. The seal gas, which may be flue gas, also provides a means for maintaining the desired pressure in the top of the reactor, a portion of the introduced seal gas passing downwardly with the catalyst through the downcomers 10 while the remainder of the gas passes upwardly into the seal leg 13 counter to the flow of the catalyst. Entry of hydrocarbon vapors into the seal leg and catalyst hopper is thereby prevented. The upwardly flowing seal gas is discharged through an outlet 15 at the top of the hopper 9, while that entering the reactor is discharged with the hydrocarbon vapors therein.

The catalyst is discharged from the reactor, after being purged by means such as steam introduced through line 16, and is then transported upwardly by means of the elevator 3 and discharged into the regenerator 2. Here it is brought into contact with an oxidizing gas which burns off the carbonaceous deposit on the catalyst during the gravitational flow of the catalyst through the regenerator; the freshly regenerated catalyst is discharged through conduit 6 into the elevator 4 for return to catalyst hopper 9.

The portions of the apparatus thus far described are of a type generally well known in the art and in commercial use. Operations of commercial units of this type are described in technical literature, as W. F. Bland, Improvements in TCC process, National Petroleum News, Tech. Sec., Dec. 6, 1944, p. R811; and R. H. Newton et al., The TCC catalytic cracking process for motor gasoline production, National Petroleum News, Tech. Sec., June 6, 1945, p. 441.

The catalyst leaving the regenerator 2 is in relatively dehydrated state and will, therefore, pick up surrounding moisture which may come in contact therewith. In typical units the housing of elevator 4 being unsealed against the admission of atmospheric air and steam in the vicinity, moisture is readily picked up by the catalyst in the elevator and during transportation of the catalyst from the regenerator to the reactor. To maintain the catalyst in its dehydrated form during transit, means are provided in accordance with the invention, for the introduction of dried air or other inert gas such as dry flue gas into the passageway of elevator 4 so as to provide within the housing of that elevator a dry atmosphere of moisture content substantially below that of the outside air. Only sufficient dried gas need be introduced, after the elevator passageway has been initially freed of atmospheric air, to make up for leakage from the elevator housing. As shown, the dry gas may be introduced through a line 17, and vented from the top of the elevator as shown at 18. The introduced dry gas will thus substantially in its entirety pass up the shaft of elevator 4, any small portion thereof that may enter the catalyst conduit 6 would be discharged with the flue gases from the kiln. Alternatively the dry gas may be introduced at the top of the elevator through line 18 to pass downwardly in the shaft, venting at the bottom of the elevator through line 17. Steam or flue gas (not air) is passed through elevator 3, by means of lines 19 and 20, to prevent ignition of the hot coked catalyst therein.

In typical commercial units, it has been the practice to introduce flue gas, as at 14, to act as the seal gas in the leg 13. Such flue gas generally contains in the order of 1 to 2% or more by volume water vapor. It has also been proposed to employ high concentrations of steam, up to 100% steam, for this purpose. It will therefore be seen, that during the period that the catalyst is moving from the kiln and before the catalyst is brought into contact with hydrocarbons in the reactor, it is subjected to hydration with larger or smaller quantities of water vapor over fairly long periods, and the heat of hydration has ample opportunity to be dissipated. To obtain the full advantages of the present invention, accordingly, a dried seal gas, such as dried flue gas, is also introduced in the seal leg 13, and in the catalyst hopper 9, through the supply line 14, instead of steam or ordinary flue gas which contains water vapor. If desired, the dry flue gas or additional dry gas may also be introduced directly into the catalyst hopper through line 21.

Figure 2 illustrates one form of apparatus of the general type, designed particularly for small units, wherein a single elevator is employed for carrying both the coke-containing catalyst from the reactor as well as the regenerated catalyst from the kiln in a sectioned bucket 22, such as is pictorially illustrated in Fig. 3. The construction of the elevator is such that sections of the bucket are selectively charged and discharged at prescribed stations to appropriately receive coke-containing catalyst to be delivered to the regenerator kiln and to receive freshly regenerated catalyst from the kiln for delivery to the reactor. In Fig. 2, at the upper cut away portion, the front buckets are omitted to show the downcoming empty buckets and the discharge thereof. Other details of a single elevator type unit are described by William F. Bland in Petroleum Processing, June 1947, beginning at page 2.

In a system of the type last described, employing mechanical elevators, the use of an oxidizing gas such as air in the elevator shaft, is best avoided since such oxidizing gas may cause combustion of the coke-containing catalyst. Accordingly, the dried gas preferred to be employed in the elevator in accordance with the present invention, in a system wherein coked catalyst is present in the elevator, is one that does not effect substantial combustion. Flue gas derived by substantially complete consumption of oxygen in the air and suitably dehydrated, or suitable dried flue gas from elsewhere in the system, may be employed.

To obtain the beneficial advantages of higher catalyst temperature and release of the heat content of the catalyst to support the endothermic reaction taking place during the hydrocarbon conversion in the reactor 1, moisture is now supplied to the clay catalyst, such as by admission of steam with the hydrocarbon charge stock admitted to the reactor through the lines 11 or 12, depending on whether the operation is con-current or counter-current. If desired, steam may be separately admitted at a convenient location to hydrate the catalyst entering the reactor, the location being chosen to minimize loss of heat of hydration. For instance, steam may be admitted through line 23 to hydrate the catalyst above the downcomers 10; admission of the dry flue gas through line 14 will prevent entry of steam into the seal leg 13. Of course, process steam may be supplied with the hydrocarbon vapors in addition to the steam already used in hydrating the catalyst above that point, as described.

In a typical moving catalyst system designed to process 10,000 barrels of charge stock per day, a practical catalyst to oil ratio would involve circulating about one hundred tons of catalyst per hour. Dried air or flue gas (below 0.1 vol. per cent moisture content) is admitted to the elevator at a rate and pressure sufficient to displace atmospheric air or other moisture containing gas in the elevator and to maintain the desired dry atmosphere therein. In the event of flue gases produced by the regeneration reactions in the lower portion of regenerator 2 contain appreciable quantities of moisture, as they often do especially when regeneration is effected with atmospheric air, the quantity of dried gas admitted to elevator 4 may displace at least a portion of the moisture laden gases adsorbed by the catalyst. Thus, some drying of the catalyst may be effected in the elevator.

The catalyst delivered to the elevator 4 normally contains moisture in the order of less than ½% by weight total $H_2O$. To saturate the catalyst at its temperature entering the reactor say about 900° F., about 2% moisture can still be added thereto. The addition of this amount of moisture would effect an elevation of catalyst temperature in the order of about 75 to 100° F. and store in the catalyst a quantity of heat equal to about 15.25 B. t. u. per pound of catalyst. This increase in sensible heat content of the catalyst and the increase in temperature is utilized to increase the severity of the hydrocarbon conversion reaction taking place in the reactor 1 and effecting thereby substantial improvement in quantity and/or quality of the desired reaction products.

Obviously many modifications and variations of the invention as hereinbefore set forth may be made without departing from the spirit and scope thereof and therefore only such limitations should be imposed as are indicated in the appended claims.

I claim as my invention:

1. In a hydrocarbon conversion system employing a solid moving bed of clay catalyst, wherein clay catalyst is continuously circulated through a reaction zone for contact with hydrocarbons therein and through a separate regeneration zone for removal by burning of carbonaceous deposit formed therein, hot regenerated catalyst being returned to the reaction zone, the improvement which comprises maintaining the regenerated catalyst during its transit at a low total moisture content not substantially in excess of that contained by the catalyst on discharge from the regenerating zone by surrounding the catalyst discharged from the regenerating zone with an atmosphere of dry gas having a moisture content less than that of the outside air, and thereafter supplying water vapor to the catalyst entering the reaction zone to effect hydration with accompanying heating of the catalyst.

2. The improvement as defined in claim 1 wherein said dry gas is dried flue gas.

3. The improvement as defined in claim 1 wherein said dry gas has a moisture content not in excess of 0.1 volume percent.

4. The improvement in accordance with claim 1 wherein the low total moisture content of the catalyst is maintained up to the point that the catalyst is contacted with hydrocarbon vapors for reaction of the latter, and water vapor is supplied as process steam added to the hydrocarbon vapors.

5. The improvement in accordance with claim 1 wherein water vapor is supplied for hydrating the catalyst prior to contact of the catalyst with hydrocarbon vapors in the reaction zone.

6. In hydrocarbon conversion systems employing solid moving beds of clay catalyst, wherein separate zones are provided for hydrocarbon conversion and catalyst regeneration, the process which comprises withdrawing dry clay catalyst from a regeneration zone, said catalyst having a total moisture content at maximum of less than one half percent by weight of the catalyst, moving said dry catalyst in transit to the reaction zone while substantially maintaining the moisture content thereof below said maximum by surrounding the moving catalyst with dried gas to prevent access of atmospheric moisture thereto, and subsequently supplying water vapor to the catalyst so that the catalyst is raised in temperature by the heat due to moisture adsorption for utilization of the increased temperature of the catalyst in the hydrocarbon conversion reactions with minimum dissipation of heat prior to contact of the catalyst with the hydrocarbons to be reacted.

7. The process in accordance with claim 6 wherein the water vapor is supplied to the catalyst as therein defined, at least in part, prior to contact of the catalyst with the hydrocarbon vapors to be reacted.

8. The process in accordance with claim 6 wherein water vapor is supplied to the catalyst as therein defined, as process steam admitted with the charge of hydrocarbons to be reacted.

9. In a process of hydrocarbon conversion comprising the steps of continuously passing particles of acid-activated clay cracking catalyst downwardly as a solid compact bed through a reaction zone, contacting the catalyst in said reaction zone with hydrocarbons under catalytic cracking conditions, withdrawing from said reaction zone contaminated catalyst containing carbonaceous deposit resulting from said contact with hydrocarbons, transferring the contaminated catalyst so withdrawn to a point above a regeneration zone, passing the catalyst from said point downwardly by gravity to and through the regeneration zone as a compact bed for removal by burning of said carbonaceous deposit, discharging the hot regenerated catalyst from the regeneration zone, transporting the hot regenerated catalyst upwardly to a point above said reaction zone and returning the hot catalyst from said point to said reaction zone; the improvement which comprises maintaining the regenerated catalyst during its transit from said regeneration zone to at least said point above said reaction zone at a low total moisture content not substantially in excess of that contained by the catalyst upon discharge from the regeneration zone, and thereafter supplying water vapor to the catalyst entering the reaction zone to effect hydration thereof with accompanying heating of the catalyst.

ROPHIE E. BLAND.

REFERENCES CITED

The following references are of record in the file of this patent:

UNITED STATES PATENTS

| Number | Name | Date |
|---|---|---|
| 2,248,196 | Plummer | July 8, 1941 |
| 2,410,309 | Simpson et al. (I) | Oct. 29, 1946 |
| 2,419,507 | Simpson et al. (II) | Apr. 22, 1947 |